(12) United States Patent
Chang et al.

(10) Patent No.: US 11,489,593 B2
(45) Date of Patent: Nov. 1, 2022

(54) OPTICAL AND ELECTRICAL HYBRID BEAMFORMING TRANSMITTER, RECEIVER, AND SIGNAL PROCESSING METHOD

(71) Applicant: TMY Technology Inc., Taipei (TW)

(72) Inventors: Su-Wei Chang, Taipei (TW); Han-Ti Chuang, Taipei (TW); Wen-Tsai Tsai, Taipei (TW); Tzu-Chieh Hung, Taipei (TW); Yang Tai, Taipei (TW); Shao-Chun Hsu, Taipei (TW); Guo-Zhen Su, Taipei (TW)

(73) Assignee: TMY Technology Inc., Taipei (TW)

( * ) Notice: Subject to any disclaimer, the term of this patent is extended or adjusted under 35 U.S.C. 154(b) by 0 days.

(21) Appl. No.: 17/182,180

(22) Filed: Feb. 22, 2021

(65) Prior Publication Data

US 2022/0173810 A1   Jun. 2, 2022

(30) Foreign Application Priority Data

Dec. 2, 2020 (TW) .................. 10914232.8

(51) Int. Cl.
*H04B 10/2575* (2013.01)
*H04B 1/00* (2006.01)
*H04B 1/04* (2006.01)

(52) U.S. Cl.
CPC ..... *H04B 10/25759* (2013.01); *H04B 1/0096* (2013.01); *H04B 1/04* (2013.01); *H04B 2001/0491* (2013.01); *H04B 2210/006* (2013.01)

(58) Field of Classification Search
CPC .. H04B 10/25759; H04B 1/0096; H04B 1/04; H04B 2001/0491; H04B 2210/006
(Continued)

(56) References Cited

U.S. PATENT DOCUMENTS

| 8,737,838 B2 | 5/2014 | Adlerstein |
| 9,020,362 B2 | 4/2015 | Gupta et al. |

(Continued)

FOREIGN PATENT DOCUMENTS

| CN | 107086892 | 9/2019 |
| CN | 107078810 | 5/2020 |

(Continued)

OTHER PUBLICATIONS

Aldaya et al; A Tutorial on Optical Feeding of Millimeter-Wave Phased Array Antennas for Communication Applications; Apr. 2015; Hindawi Publishing Corporation; pp. 1-23. (Year: 2015).*

(Continued)

*Primary Examiner* — Amritbir K Sandhu
(74) *Attorney, Agent, or Firm* — JCIPRNET

(57) ABSTRACT

An optical and electrical hybrid beamforming transmitter, receiver, and signal processing method are provided. The transmitter includes, but is not limited to, two photoelectric converters, two adjusting circuits, and an antenna array. The photoelectric converter converts an optical signal into an initial electric signal, respectively. The adjusting circuit is coupled to the photoelectric converter, and are adapted for delaying the initial electric signal according to an expected beam pattern formed by the antenna array, respectively, to output an adjusted electric signal. The antenna array includes two antennas that are coupled to the adjusting circuit. The antenna radiates electromagnetic wave according to the adjusted electric signal. Accordingly, a phase of the signal may be adjusted, and the number of the elements may be reduced.

15 Claims, 5 Drawing Sheets

(58) Field of Classification Search
USPC .......................................................... 398/115
See application file for complete search history.

(56) References Cited

U.S. PATENT DOCUMENTS

| | | | |
|---|---|---|---|
| 9,753,351 B2* | 9/2017 | Eldada | G01S 7/4817 |
| 10,559,880 B1* | 2/2020 | Garrett | H01Q 1/241 |
| 2013/0322509 A1* | 12/2013 | Harel | H04B 7/086 |
| | | | 375/227 |
| 2015/0303986 A1* | 10/2015 | Shi | H01Q 3/2676 |
| | | | 375/130 |
| 2016/0127027 A1* | 5/2016 | Ling | H01Q 3/267 |
| | | | 398/115 |
| 2016/0352407 A1 | 12/2016 | Ling | |
| 2018/0039154 A1* | 2/2018 | Hashemi | G02F 1/2955 |
| 2019/0229808 A1* | 7/2019 | Calhoun | H01Q 21/0006 |
| 2020/0280127 A1* | 9/2020 | Hormis | H04B 7/155 |
| 2021/0067182 A1* | 3/2021 | Ravi | H04B 1/0483 |
| 2021/0330295 A1* | 10/2021 | Soleimani | G01S 15/8915 |
| 2021/0384976 A1* | 12/2021 | Torfs | H04W 88/085 |

FOREIGN PATENT DOCUMENTS

| | | |
|---|---|---|
| CN | 111193560 | 5/2020 |
| CN | 111954227 | 11/2020 |
| TW | 200531447 | 9/2005 |
| TW | 202017329 | 5/2020 |
| WO | 2020078781 | 4/2020 |

OTHER PUBLICATIONS

Wu et al; Optical beam forming for phased-array antennas; Feb. 2007; University of Twente; pp. 1-5. (Year: 2007).*

"Search Report of Europe Counterpart Application", dated Oct. 4, 2021, p. 1-p. 10.

"Office Action of Taiwan Counterpart Application", dated Aug. 26, 2021, p. 1-p. 7.

* cited by examiner

OPTICAL AND ELECTRICAL HYBRID BEAMFORMING TRANSMITTER, RECEIVER, AND SIGNAL PROCESSING METHOD

CROSS-REFERENCE TO RELATED APPLICATION

This application claims the priority benefit of Taiwan patent application no. 109142328, filed on Dec. 2, 2020. The entirety of the above-mentioned patent application is hereby incorporated by reference herein and made a part of this specification.

BACKGROUND

Technical Field

The disclosure relates to a communication technology, and in particular to an optical and electrical hybrid beamforming transmitter, receiver, and signal processing method.

Description of Related Art

With a rapid development of wireless communication technology, a demand for related application services (such as high definition video or music streaming, movie downloading, virtual reality (VR), etc.) has increased. In order to meet a bandwidth requirement of the services, an antenna array with a high energy gain and directivity has been proposed to increase a signal noise ratio (SNR).

On the other hand, radio frequency band resources are becoming scarce. For example, it is difficult for a microwave frequency band configured in fifth-generation (5G) mobile communications to meet a high-bandwidth requirement. If a system is combined with optical fiber communication, more bandwidth and spectrum resources may be provided. In addition, if the system is further combined with features of an antenna array, an optical antenna array can further increase an antenna gain.

FIG. 1 is a block diagram of elements of a conventional optical array antenna architecture 10. Referring to FIG. 1, the optical array antenna architecture 10 includes a wavelength division multiplexer (WDM) 11, a coupler (CPL) 12, a variable delay line (VDL) 13, and an optical antenna array 14. Different VDLs 13 cause a phase difference to wavelengths of different paths of light, thereby achieving beamforming. However, optical beamforming in actual execution has requirements as follows: wavelengths λ1 and λ2 of a light wave need to be adjusted accurately to achieve an expected phase difference; and true delay is required for phases of two paths/channels to be equal. The above requirements are relatively difficult to execute.

SUMMARY

In view of the above, embodiments of the disclosure provide an optical and electrical hybrid beamforming transmitter, receiver, and signal processing method. In the embodiments of the disclosure, a phase of each path may be adjusted.

The optical and electrical hybrid beamforming transmitter of the embodiments of the disclosure includes (but is not limited to) two photoelectric converters, two adjusting circuits, and an antenna array. The two photoelectric converters are configured to convert two optical signals into two initial electric signals, respectively. The two adjusting circuits are coupled to the two photoelectric converters, respectively, and are configured to delay the two initial electric signals, respectively, according to an expected beam pattern formed by the antenna array to output two adjusted electric signals. The antenna array includes two antennas. The two antennas are coupled to the two adjusting circuits, respectively. The antenna array radiates electromagnetic wave according to the two adjusted electric signals.

The optical and electrical hybrid beamforming receiver of the embodiments of the disclosure includes (but is not limited to) an antenna array, two adjusting circuits, and two electric-to-optic converters. The antenna array includes two antennas. The two antennas are configured to receive two received electric signals, respectively. The two adjusting circuits are coupled to the two antennas, respectively, and are configured to delay the two received electric signals, respectively, according to an expected beam pattern formed by the antenna array to output two adjusted electric signals. The two electric-to-optic converters are coupled to the two adjusting circuits, respectively, and are configured to convert the two electric signals into two optical signals, respectively.

The optical and electrical hybrid beamforming signal processing method of the embodiments of the disclosure is adapted for the transmitter, and includes (but is not limited to) the following steps: two optical signals are converted into two initial electric signals, respectively. The two initial electric signals are delayed, respectively, according to an expected beam pattern formed by an antenna array to output two adjusted electric signals. Electromagnetic wave is radiated through the antenna array according to the two adjusted electric signals. The antenna array includes two antennas corresponding to the two adjusted electric signals, respectively.

The optical and electrical hybrid beamforming signal processing method of the embodiments of the disclosure is adapted for the receiver, and includes (but is not limited to) the following steps: two received electric signals are received through two antennas of an antenna array, respectively. The two received electric signals are delayed, respectively, according to an expected beam pattern formed by an antenna array to output two adjusted electric signals. The two adjusted electric signals are converted into two optical signals, respectively.

Based on the above, in the optical and electrical hybrid beamforming transmitter, receiver, and signal processing method in the embodiments of the disclosure, the photoelectric converter is provided to each antenna of the transmitter, and the electric-to-optic converter is provided to each antenna of the receiver, to adjust the phase of the electric signals (that is, to delay the signals) and enable the phase of the signals of each channel to meet the requirement of the beam pattern of the antenna. Accordingly, different from a conventional architecture, a wavelength division multiplexer (WDM) and variable delay line (VDL) do not need to be set in an architecture of the disclosure, thereby reducing elements. In addition, different from conventional optical beamforming, an optical-electrical hybrid beamforming architecture of the embodiments of the disclosure may be easily adjusted to a specified phase, and a phase calibration is thus completed.

In order to further illustrate the features of the disclosure, embodiments are described in detail as follows in connection with accompanying drawings.

DESCRIPTION OF THE EMBODIMENTS

Figure 2:
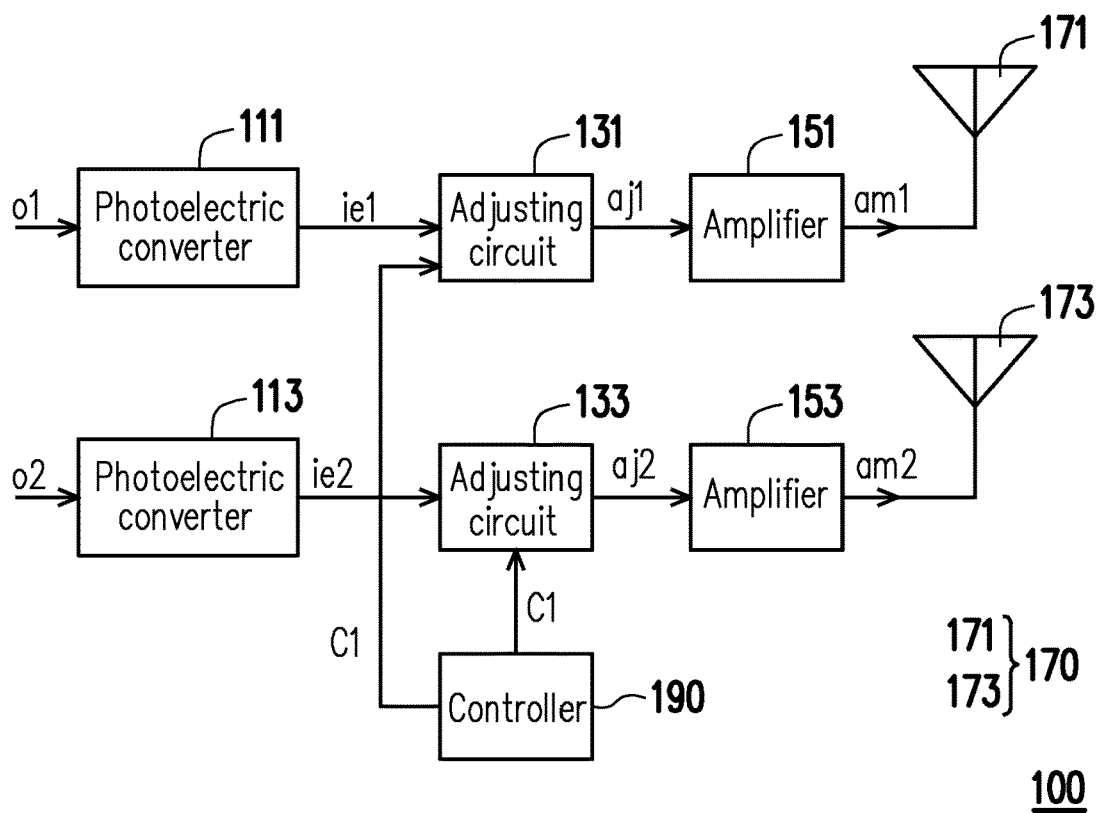
FIG. 2 is a block diagram of elements of an optical and electrical hybrid beamforming transmitter according to an embodiment of the disclosure.

FIG. 2 is a block diagram of elements of an optical and electrical hybrid beamforming transmitter 100 according to an embodiment of the disclosure. Referring to FIG. 2, a transmitter 100 includes (but is not limited to) photoelectric converters 111 and 113, adjusting circuits 131 and 133, an antenna array 170, and a controller 190.

The photoelectric converters 111 and 113 may be photodiodes (PDs), optical detectors, or other optical sensors that convert light into current or voltage signals. In an embodiment, the photoelectric converters 111 and 113 convert optical signals o1 and o2 into initial electric signals ie1 and ie2, respectively.

The adjusting circuits 131 and 133 are coupled to the photoelectric converters 111 and 113, respectively. The adjusting circuits 131 and 133 may be chips, application specified integrated circuits (ASICs), field programmable gate arrays (FPGAs), microcontrollers, or other types of circuits.

In an embodiment, the adjusting circuits 131 and 133 include phase shifters. The phase shifters are configured to delay the initial electric signals ie1 and ie2 according to an expected beam pattern formed by the antenna array 170 (that is, to adjust a phase). For example, a phase shift is generated by switching transmission lines, loads, or low-and-high-pass filters through a mechanical switch, a relay, a PIN diode, a field effect transistor (FET) or a micro electro mechanical system (MEMS), or other switch elements.

In another embodiment, in addition to the elements for adjusting the phase of an input signal, the adjusting circuits 131 and 133 further include an amplitude attenuator. The amplitude attenuator is configured to adjust an amplitude of the initial electric signals ie1 and ie2 according to the beam pattern.

In some embodiments, the adjusting circuits 131 and 133 may only include amplitude attenuators. That is, phases corresponding to some or all channels in the adjusting circuits 131 and 133 are fixed. In this way, adjusted electric signals aj1 and aj2 may be output by generating the initial electric signals ie1 and ie2 which have been delayed and/or whose amplitudes have been changed.

The antenna array 170 at least includes two antennas 171 and 173. The antennas 171 and 173 are coupled to the adjusting circuits 131 and 133, respectively. In an embodiment, the antenna array 170 is configured to radiate electromagnetic wave according to the adjusted electric signals aj1 and aj2.

It is to be noted that by changing a phase and amplitude corresponding to each of the antennas 171 and 173, electromagnetic wave may be superimposed on each other in a specific direction and offset each other in some directions based on constructive and destructive interferences, thereby enabling a far field pattern formed by radiation of the antenna array 170 to be equal to a specific beam pattern (which is related to a field pattern formed by parameters such as a main beam direction, a beam width, a directional gain, a side beam level, etc.).

The controller 190 is coupled to the adjusting circuits 131 and 133. The controller 190 may be a chip, an ASIC, a FPGA, a microcontroller, or other types of circuits. In an embodiment, the controller 190 outputs an adjustment command C1, so that the adjusting circuits 131 and 133 are controlled by the controller 190.

In some embodiments, the transmitter 100 further includes amplifiers 151 and 153. The amplifiers 151 and 153 are coupled to the adjusting circuits 131 and 133. The amplifier 150 includes one or more amplifiers. The amplifier is, for example, a circuit such as a low-noise amplifier or a power amplifier. In an embodiment, the amplifiers 151 and 153 are configured to control a waveform of an output signal to enable the waveform of the output signal to be equal to a waveform of the input signal, but the output signal may have a larger amplitude. In an embodiment, the amplifiers 151 and 153 amplify the adjusted electric signals aj1 and aj2 to output amplified electric signals am1 and am2, respectively.

In addition, the embodiments of the disclosure may further be applied to an architecture with more channels.

Figure 3:
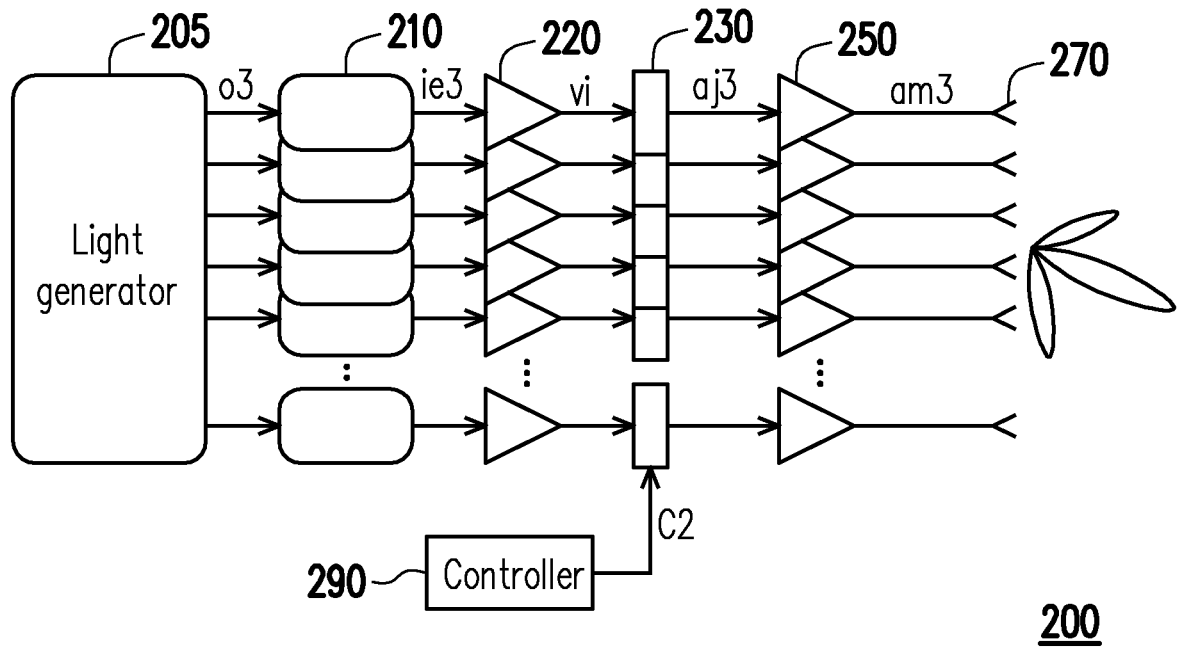
FIG. 3 is a schematic diagram of an optical and electrical hybrid beamforming transmitter according to another embodiment of the disclosure.

FIG. 3 is a schematic diagram of an optical and electrical hybrid beamforming transmitter 200 according to another embodiment of the disclosure. Referring to FIG. 3, a transmitter 200 includes (but is not limited to) a light generator 205, three or more photoelectric converters 210, three or more transimpedance amplifiers (TIAs) 220, three or more adjusting circuits 230, three or more amplifiers 250, an antenna array 270 (including three or more antennas), and a controller 290. Each channel corresponds to a light generator 205, an photoelectric converter 210, a TIA 220, an adjusting circuit 230, an amplifier 250, and an antenna in the antenna array 270 connected in series.

Figure 1:
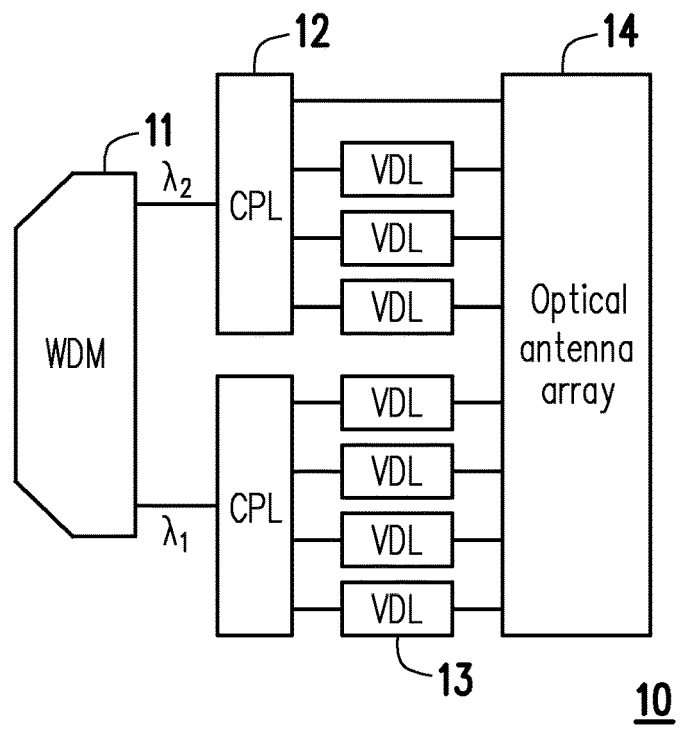
FIG. 1 is a block diagram of elements of a conventional optical array antenna architecture.

Implementation forms of the photoelectric converters 210, the adjusting circuits 230, the amplifiers 250, the antenna array 270, and the controller 290 can be found in the descriptions of the photoelectric converters 111 and 113, the adjusting circuits 131 and 133, the amplifiers 151 and 153, the antenna array 170, and the controller 190 in FIG. 1 respectively, and will not be repeated herein.

Figure 4:
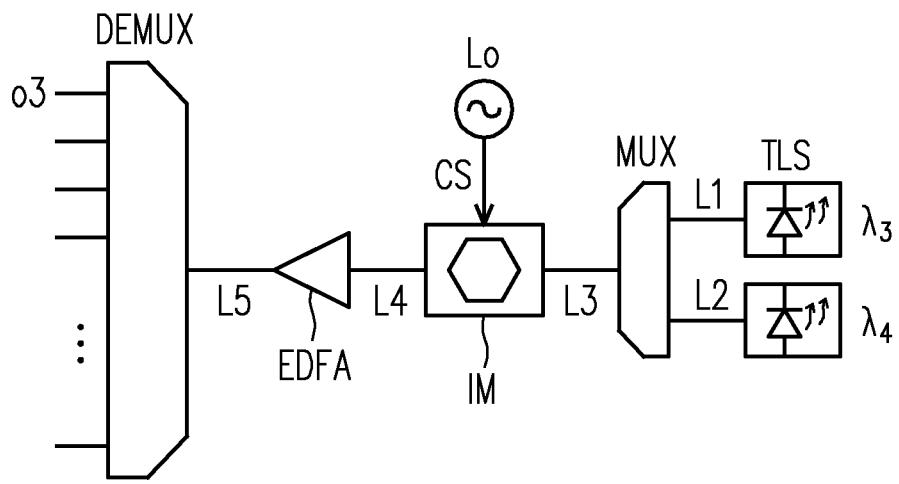
FIG. 4 is a schematic diagram of a light generator according to an embodiment of the disclosure.

The light generator 205 is coupled to the photoelectric converters 210. In an embodiment, the light generator 205 is configured to generate multiple optical signals o3. For example, FIG. 4 is a schematic diagram of the light generator 205 according to an embodiment of the disclosure. Referring to FIG. 4, the light generator 205 includes (but is not limited to) tunable light sources TLS, a multiplexer MUX, a modulator IM, a local oscillator LO, an erbium-doped optical fiber amplifier EDFA, and a demultiplexer DEMUX.

The two tunable light source TLSs generate optical signals L1 and L2 according to wavelengths $\lambda 3$ and $\lambda 4$, respectively. The demultiplexer MUX combines the two optical signals L1 and L2 with different wavelengths λ3 and λ4 into an optical signal L3. The modulator IM mixes the optical signal L3 according to a reference signal CS provided by the local oscillator LO to output an optical signal L4. The erbium-doped optical fiber amplifier EDFA amplifies the optical signal L4 to output an optical signal L5. The demultiplexer DEMUX demultiplexes the optical signal L5 to form the optical signals o3 on different channels.

It is to be noted that the light generator 205 may further have other implementation forms, and a user can modify the light generator 205 according to needs, and the disclosure is not limited thereto.

In addition, the TIAs 220 are coupled between the photoelectric converters 210 and the adjusting circuits 230. In an embodiment, the TIAs 220 are configured to convert a current signal output by the photoelectric converters 210 into a voltage signal, so that impedance matching when the optical signal is converted to a radio frequency domain may be more efficient.

It is to be noted that the number of the channels of the transmitter 200 may exceed ten groups, such as 16 groups, 32 groups, or 64 groups. However, the embodiments of the disclosure do not limit the number of the channels. In some embodiments, more antennas in the antenna array 270 may facilitate beamforming. For example, a shape of a main beam is relatively narrow and a directional gain of the main beam is relatively large, and an amplitude of a side beam is relatively low, but the disclosure is not limited thereto.

Referring to FIG. 3, the transmitter 200 of the embodiments of the disclosure provides an optical-electric hybrid (also known as radio over fiber (RoF)) beamforming architecture. The light generator 205 and the photoelectric converters 210 form an optical beamforming architecture in an optical domain; the adjusting circuits 230, the amplifiers 250, and the antenna array 270 form an analog beamforming architecture in a radio frequency domain.

Figure 5A:
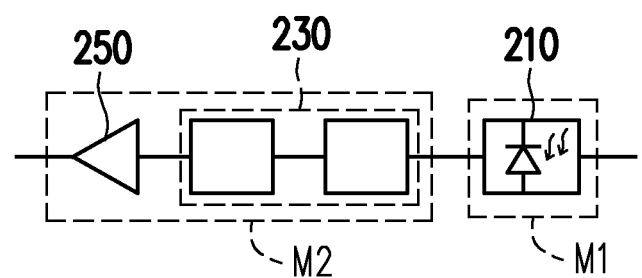
FIG. 5A is a schematic diagram of element modularization according to an embodiment of the disclosure.

In an embodiment, multiple elements in the transmitter 200 may be packaged together. FIG. 5A is a schematic diagram of element modularization according to an embodiment of the disclosure. Referring to FIG. 5A, taking a path (a channel) as an example, the photoelectric converter 210 may be packaged as a module M1, and the adjusting circuit 230 and the amplifier 250 may be packaged together as a module M2.

Figure 5B:
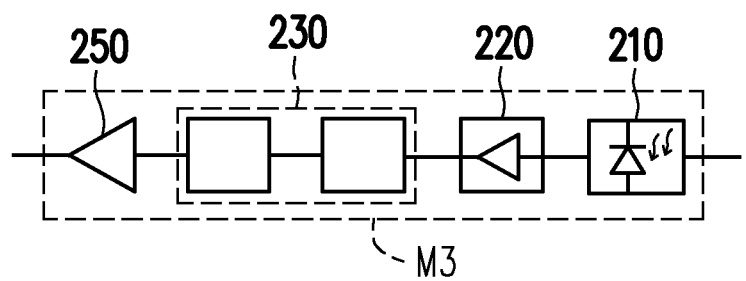
FIG. 5B is a schematic diagram of element modularization according to another embodiment of the disclosure.

FIG. 5B is a schematic diagram of element modularization according to another embodiment of the disclosure. Referring to FIG. 5B, the photoelectric converter 210, the TIA 220, the adjusting circuit 230, and the amplifier 250 may be packaged together as a module M3. With the new packaging forms and the TIA 220 following the photoelectric converter 210, impedance matching may be improved, thereby improving efficiency. In addition, once an overall packaging is completed, loss during a module integration may be reduced, thereby improving an overall performance.

It is to be noted that in FIGS. 5A and 5B, the elements are packaged in a single-channel manner. However, in other embodiments, the elements may be packaged in an array manner (a multi-channel manner) to meet a need of a multi-channel module. That is, two or more photoelectric converters 210, two or more transimpedance amplifiers 220, two or more adjusting circuits 230, and two or more amplifiers 250 are packaged together. For example, a 1×4 (that is, 4-channel), 1×8 (that is, 8-channel), or 1×16 (that is, 16-channel) array is packaged together.

The following is a description of an operation process of the transmitters 100 and 200. For a clear description, the transmitter 200 will be configured as a main body. Descriptions of the same or corresponding elements in the transmitter 100 can be found in the description of the transmitter 200, and will not be repeated herein.

Figure 6:
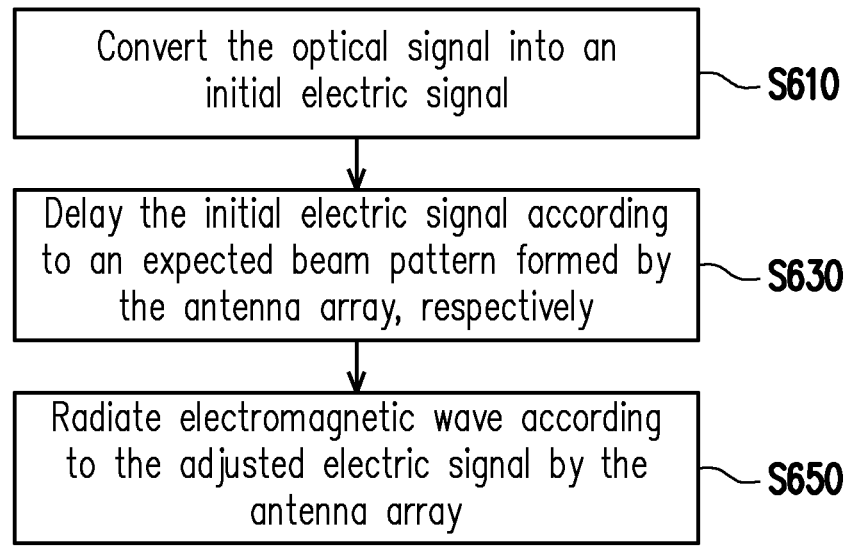
FIG. 6 is a flowchart of an optical and electrical hybrid beamforming signal processing method according to an embodiment of the disclosure.

FIG. 6 is a flowchart of an optical and electrical hybrid beamforming signal processing method according to an embodiment of the disclosure. Referring to FIG. 6, each of the photoelectric converters 210 receives an optical signal o3 from the light generator 205, and converts the optical signal o3 into an initial electric signal ie3 (step S610). Each of the photoelectric converters 210 may convert the optical signal o3 into an initial electric signal ie3 in a form of current or voltage. In an embodiment, if the initial electric signal ie3 is in a current form, each of the TIAs 220 may convert the initial electric signal ie3 into a voltage form to generate a voltage signal vi. In another embodiment, if the initial electric signal ie3 is in the voltage form, the TIAs 220 may be omitted.

Each of the adjusting circuits 230 may delay the initial electric signal ie3 according to an expected beam pattern formed by the corresponding antenna array 270, respectively, to output an adjusted electric signal am3 (step S630). Specifically, beamforming formed by radiation of the antennas in the antenna array 270 may have different field patterns due to having different phases or a phase difference with adjacent channels (such as different radiation directions, gains or shapes, and an example of beamforming is on a right-hand side of FIG. 3). In some embodiments, in order to enable the antenna array 270 to achieve a specific direction or gain (that is, an amplitude), a corresponding phase (that is, a delay time) of each channel may be different. Therefore, the adjusting circuits 230 on all or a part of the channels adjust a phase of the initial electric signals ie3 or the voltage signals vi input by the adjusting circuits 230, respectively. Accordingly, the signal may be delayed, so that phases of the adjusted electric signal aj3 on different channels are different, thereby forming a phase difference and achieving beamforming in different directions. In addition, all or a part of the adjusting circuits 230 may also adjust an amplitude of the initial electric signals ie3 or the voltage signals vi input by the adjusting circuits 230, respectively, thereby changing the beam width or gain.

In an embodiment, the controller 290 may set a beam pattern corresponding to the antenna array 270 (that is, expected beamforming to be formed, including a beam direction and a field pattern), and form an adjustment command C2 accordingly. Each of the adjusting circuits 230 may generate the adjusted electric signal aj3 according to the adjustment command C2. In other words, the amplitude and/or the phase of the initial electric signals ie3 or the voltage signals vi are controlled through a command issued by the controller 290 on all or a part of the adjusting circuits 230, thereby adjusting the phase and/or gain.

In some embodiments, the amplitude or the phase of the initial electric signals ie3 or the voltage signals vi of some channels are fixed, and only the amplitude or phase of the initial electric signals ie3 or the voltage signals vi of other part of the channels may be adjusted.

In addition, the same elements on different channels may still cause a phase difference. Therefore, a phase calibration is needed. In another embodiment, the controller 290 may set an initial phase and form another adjustment command C2 related to the calibration accordingly. Each of the adjusting circuits 230 may be calibrated to this initial phase according to the adjustment command C2 to enable the initial phases to be consistent. Accordingly, a subsequent phase adjustment of each channel may enable the phases to be accurately adjusted to the specified beam pattern.

In some embodiments, the controller 290 may provide an internal transmission interface (such as a serial peripheral interface (SPI), a universal synchronous asynchronous receiver transmitter (UART), or an I2C, etc.) to connect and control the adjusting circuits 230 accordingly. In addition, an external computing device (such as a personal computer, a notebook computer, or a smartphone, etc.) may connect the controller 290 through an external transmission interface (such as Ethernet, or USB, etc.) and control the controller 290 accordingly. The computing device may provide a window interface to facilitate setting by an operator, and may modify, read, or store data of settings related to the command or the beam field. The calibration data stored in a non-volatile memory is read into the memory by the controller 290 every time the system is restarted, and the controller 290 writes the data into a register of the adjusting circuits 230 through the internal transmission interface to achieve the calibration function. In addition, the computing device may dynamically load a function library to provide software development and calibration automation functions.

It is to be noted that the adjusting circuits 230 in the analog beamforming architecture adjust a phase difference generated in an optical end link to further calibrate a phase matching. After the phase calibration, front-end beamforming is achievable through the analog beamforming architecture. A back-end optical beamforming architecture may realize fine-tuning, thereby allowing overall beamforming to be more efficiently realized and more broadly adjusted.

In an embodiment, each of the amplifiers 250 may amplify the adjusted electric signal aj3 to output the amplified electric signal am3. In other words, an amplitude of the amplified electric signal am3 may exceed an amplitude of the adjusted electric signal aj3.

Next, the antenna array 270 may radiate electromagnetic wave according to the adjusted electric signals aj3 (step S650). It is to be noted that the adjusted electric signals aj3 that assign different phases and/or amplitudes to multiple channels enable the antenna array 270 to form a phased array, thereby strengthening an intensity of the electromagnetic wave in a specified direction and suppressing an intensity of the electromagnetic wave in other directions. Accordingly, a far field pattern of the antenna array 270 may be equal to the expected beam pattern to be formed.

In some embodiments, if the amplifiers 250 are provided, the antenna array 270 may radiate electromagnetic wave according to the amplified electric signals am3.

In addition to a transmitting end, a similar inventive concept may also be applied to a receiving end.

Figure 7:
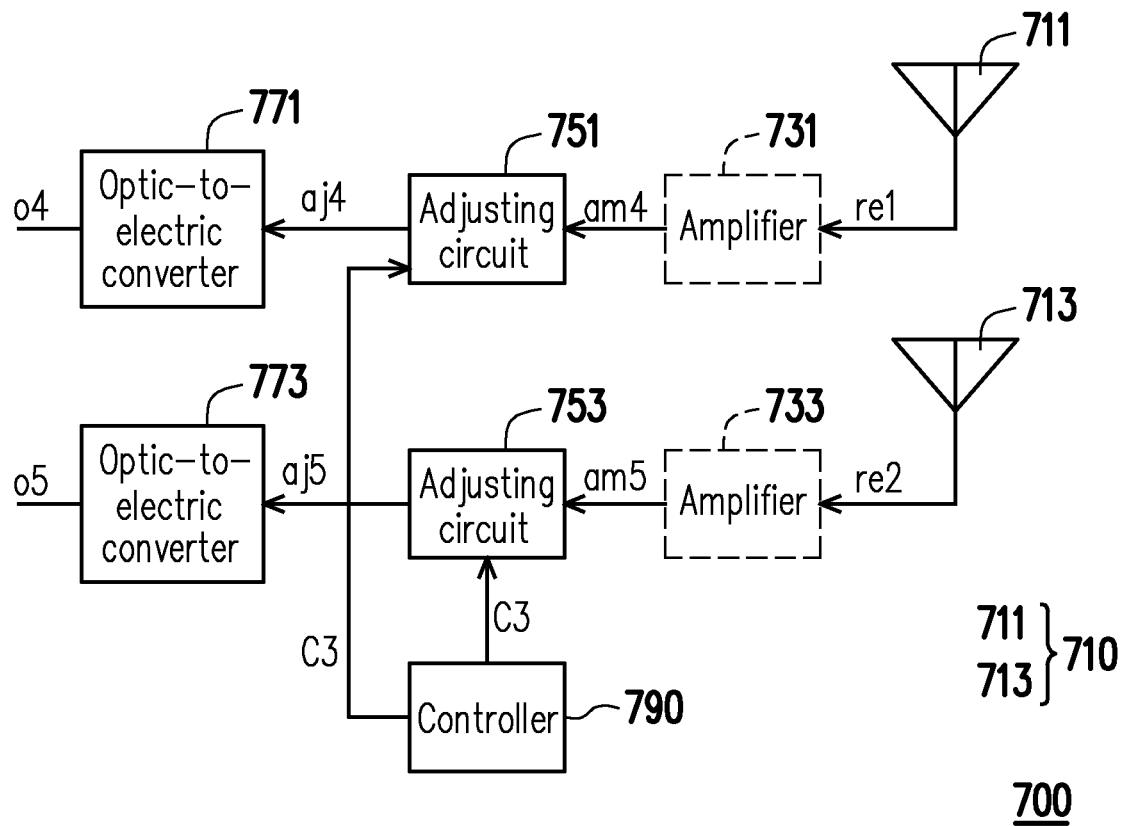
FIG. 7 is a block diagram of elements of an optical and electrical hybrid beamforming receiver according to an embodiment of the disclosure.

FIG. 7 is a block diagram of elements of an optical and electrical hybrid beamforming receiver 700 according to an embodiment of the disclosure. Referring to FIG. 7, the receiver 700 includes (but is not limited to) an antenna array 710, adjusting circuits 751 and 753, electric-to-optic converters 771 and 773, and a controller 790. In some embodiments, the receiver 700 may further include amplifiers 731 and 733. Implementation forms of the antenna array 710, the amplifiers 731 and 733, adjusting circuits 751 and 753, and the controller 790 can be found in the descriptions of the antenna arrays 170 and 270, the amplifiers 151, 153, and 250, the adjusting circuits 131, 133, and 230, and the controllers 190 and 290 of the transmitters 100 and 200, respectively, and will not be repeated herein.

A main difference between the receiver 700 and the transmitter 100 is that the amplifiers 731 and 733 and the amplifiers 151 and 153 are in opposite directions, respectively, and the adjusting circuits 751 and 753 and the adjusting circuits 131 and 133 are in opposite directions, respectively. In addition, in the receiver 700, the photoelectric converters 111 and 113 are replaced by the electric-to-optic converters 771 and 773.

Specifically, the antenna array 710 includes two antennas 711 and 713. The two antennas 711 and 713 radiate electromagnetic wave and receive two received electric signals re1 and re2.

The amplifiers 731 and 733 are coupled to the two antennas 711 and 713 of the antenna array 710, respectively, and are configured to amplify the received electric signals re1 and re2 to output amplified electric signals am4 and am5.

The adjusting circuits 751 and 753 are coupled to the antennas 711 and 713 or the amplifiers 731 and 733, and are configured to delay the amplified electric signals am4 and am5 or the received electric signals re1 and re2, respectively, according to an expected beam pattern (that is, a specified beam pattern) formed by the antenna array 710, to output adjusted electric signals aj4 and aj5.

In some embodiments, the adjusting circuits 751 and 753 further adjust amplitudes of the amplified electric signals am4 and am5 or the received electric signals re1 and re2 according to the beam pattern.

The electric-to-optic converters 771 and 773 are coupled to the adjusting circuits 751 and 753. The electric-to-optic converters 771 and 773 may be laser diodes (LDs), laser generators, or other generators that convert electrical energy into light energy. In an embodiment, the electric-to-optic converters 771 and 773 are configured to convert the adjusted electric signals aj4 and aj5 into optical signals o4 and o5, respectively.

In addition, in an embodiment, the controller 790 is coupled to the adjusting circuits 751 and 753, and is configured to set a beam pattern corresponding to the antenna array 710 and form an adjustment command C3 accordingly. The adjusting circuits 751 and 753 may generate the adjusted electric signals aj4 and aj5 according to the adjustment command C3.

In another embodiment, regarding phase calibration, the controller 790 may be configured to set an initial phase, and form another adjustment command C3 related to the phase calibration accordingly. The adjusting circuits 751 and 753 may be calibrated to the initial phase according to the adjustment command C3 related to this phase to enable the initial phases to be consistent.

In addition, the embodiments of the disclosure may further be applied to an architecture with more channels.

Figure 8:
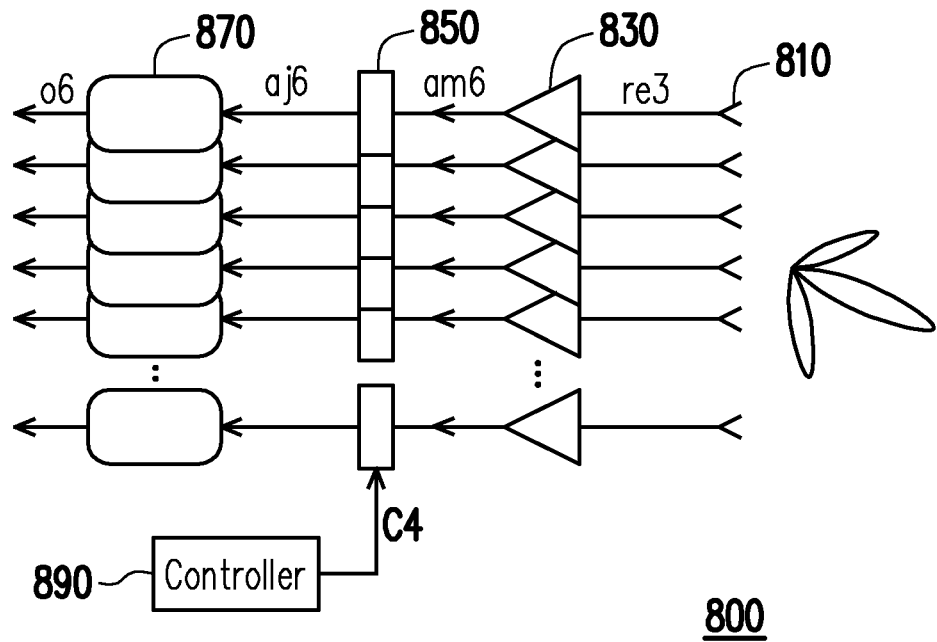
FIG. 8 is a schematic diagram of an optical and electrical hybrid beamforming receiver according to another embodiment of the disclosure.

FIG. 8 is a schematic diagram of an optical and electrical hybrid beamforming receiver 800 according to another embodiment of the disclosure. Referring to FIG. 8, a receiver 800 includes (but is not limited to) multiple antenna arrays 810, multiple amplifiers 830, multiple adjusting circuits 850, and multiple electric-to-optic converters 870. Each channel corresponds to an antenna in the antenna arrays 810, an amplifier 830, an adjusting circuit 850 and an electric-to-optic converter 870 connected in series.

The implementation forms of the antenna arrays 810, the amplifiers 830, the adjusting circuits 850 and the electric-to-optic converters 870 can be found in the descriptions of the antenna arrays 710, the amplifiers 731 and 733, the adjusting circuits 751 and 753, and the electric-to-optic converters 771 and 773 in FIG. 7 respectively, and will not be repeated herein.

It is to be noted that the number of the channels of the receiver 800 may exceed ten groups, such as 16 groups, 32 groups, or 64 groups. However, the embodiments of the disclosure do not limit the number of the channels. In some embodiments, more antennas in the antenna array 810 may facilitate beamforming.

Similarly, the receiver 800 of the embodiments of the disclosure provides an optical-electric hybrid (also known as an RoF) beamforming architecture. The electric-to-optic converters 870 form an optical beamforming architecture in an optical domain; the amplifiers 830, the adjusting circuits 850, and the electric-to-optic converters 870 form an analog beamforming architecture in a radio frequency domain.

The following is a description of an operation process of the receivers 700 and 800. For a clear description, the receiver 800 will be configured as a main body. Descriptions of the same or corresponding elements in the receiver 700 can be found in the description of the receiver 800, and will not be repeated herein.

Figure 9:
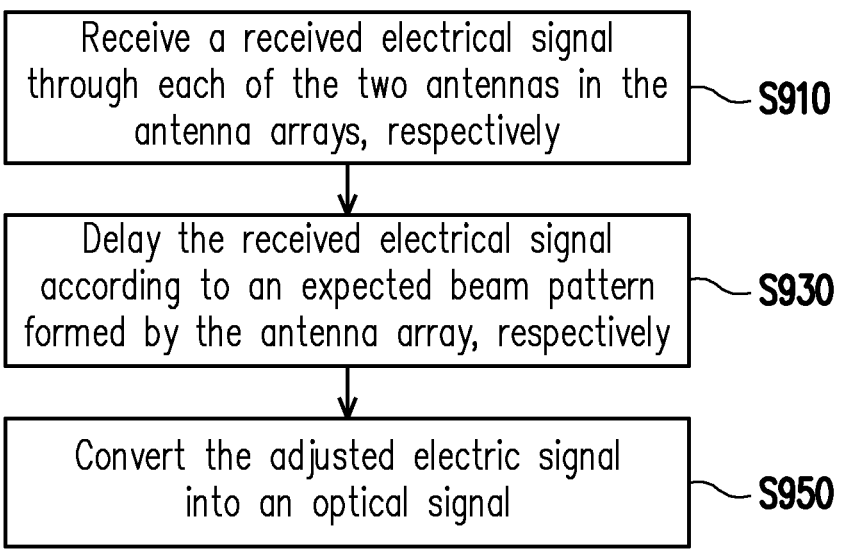
FIG. 9 is a flowchart of an optical and electrical hybrid beamforming signal processing method according to an embodiment of the disclosure.

FIG. 9 is a flowchart of an optical and electrical hybrid beamforming signal processing method according to an embodiment of the disclosure. Referring to FIG. 9, each of the antennas in the antenna arrays 810 receive a corresponding received electric signal re3, respectively (step S910).

In an embodiment, each of the amplifiers 830 amplifies the corresponding received electric signal re3 to output a corresponding amplified electric signal am6.

Each of the adjusting circuits 850 delays the corresponding received electric signal re3 according to an expected beam pattern formed by the antenna array 810 to be corresponded to, respectively, to output a corresponding adjusted electric signal aj6 (step S930). Each antenna of the antenna arrays 810 is assigned a different phase delay to compensate for a difference in an arrival time of a wave front of a radio signal. Accordingly, a corresponding received beam pattern may be provided according to a direction of arrival (DoA) of the wave front of the radio signal.

In some embodiments, if the amplifiers 830 are provided, the adjusting circuits 850 may delay the amplified electric signals am6, respectively.

Each of the electric-to-optic converters 870 converts the corresponding adjusted electric signal aj6 into a corresponding optical signal o6 (step S950).

In addition, the controllers 890 may set a beam pattern or an initial phase corresponding to each of the antenna arrays 810, and form an adjustment command C4 accordingly. Accordingly, each of the adjusting circuits 850 may generate the adjusted electric signal aj6 or may be calibrated to the initial phase according to the adjustment command C4.

It is to be noted that details of the steps can be found in the descriptions of FIGS. 2 to 4 and FIG. 7 respectively, and will not be repeated herein. Similarly, specified beamforming may be achieved by performing a phase calibration on the adjusting circuit 850 on each channel and then adjusting a phase and/or an amplitude of the adjusted electric signal aj6 output by the adjusting circuit 850 to a phase and/or an amplitude corresponding to a specified beam pattern.

In summary, in the optical-electrical hybrid beamforming transmitter, receiver, and signal processing method of the embodiments of the disclosure, the optical-electrical hybrid beamforming architecture is realized through the transmitter and the receiver. The phase of each of the electric signals is adjusted, and the phase of each of the signals of each channel is designed to meet the requirement of the beam pattern of the antenna arrays. In addition, a specified phase difference may be accurately formed on multiple channels, and beamforming may be achieved. Different from a conventional architecture, a wavelength division multiplexer (WDM) and a variable delay line (VDL) do not need to be disposed in the optical-electrical hybrid beamforming architecture of the embodiments of the disclosure, thereby reducing elements. In addition, the optical-electric hybrid beamforming architecture of the disclosure may be easily adjusted to a specified phase, and the phase calibration is thus completed.

Although the disclosure has been disclosed in the embodiments, the embodiments are not intended to limit the disclosure. Those skilled in the relevant technical field may make changes and modifications without departing from the spirit and scope of the disclosure. The scope of protection of the disclosure shall be determined by the scope of the attached claims.

What is claimed is:

1. An optical and electrical hybrid beamforming transmitter, comprising:
a first photoelectric converter, adapted for converting a first optical signal into a first initial electric signal;
a first adjusting circuit, coupled to the first photoelectric converter, adapted for delaying the first initial electric signal according to an expected beam pattern formed by an antenna array to output a first adjusted electric signal;
a second photoelectric converter, adapted for converting a second optical signal into a second initial electric signal;
a second adjusting circuit, coupled to the second photoelectric converter, adapted for delaying the second initial electric signal according to the expected beam pattern to output a second adjusted electric signal, wherein the first adjusting circuit and the second adjusting circuit are calibrated to an initial phase to enable the initial phases of the first adjusting circuit and the second adjusting circuit to be consistent, and a subsequent phase adjustment of the first initial electric signal and the second initial electric signal for the expected beam pattern are applied in response to a calibration of the initial phase; and
the antenna array, comprising:
a first antenna, coupled to the first adjusting circuit; and
a second antenna, coupled to the second adjusting circuit, wherein the antenna array radiates electromagnetic wave according to the first adjusted electric signal and the second adjusted electric signal.

2. The optical and electrical hybrid beamforming transmitter according to claim 1, wherein
the first adjusting circuit further adjusts an amplitude of the first initial electric signal according to the expected beam pattern.

3. The optical and electrical hybrid beamforming transmitter according to claim 1, further comprising:
an amplifier, coupled to the first adjusting circuit and the first antenna, adapted for amplifying the first adjusted electric signal to output an amplified electric signal, wherein the first antenna radiates according to the amplified electric signal.

4. The optical and electrical hybrid beamforming transmitter according to claim 1, wherein a phase of the first adjusted electric signal and a phase of the second adjusted electric signal are different.

5. The optical and electrical hybrid beamforming transmitter according to claim 1, further comprising:
a controller, coupled to the first adjusting circuit and the second adjusting circuit, adapted for setting the expected beam pattern formed by the antenna array and forming an adjustment command accordingly, wherein the first adjusting circuit and the second adjusting circuit generate the first adjusted electric signal and the second adjusted electric signal, respectively, according to the adjustment command.

6. The optical and electrical hybrid beamforming transmitter according to claim 1, further comprising:
a controller, coupled to the first adjusting circuit and the second adjusting circuit, adapted for setting the initial phase and forming a second adjustment command accordingly, wherein
the first adjusting circuit and the second adjusting circuit are calibrated to the initial phase according to the second adjustment command.

7. The optical and electrical hybrid beamforming transmitter according to claim 3, further comprising:
a transimpedance amplifier (TIA), coupled between the first photoelectric converter and the first adjusting circuit, wherein the first photoelectric converter, the TIA, the first adjusting circuit, and the amplifier are packaged together.

8. An optical and electrical hybrid beamforming receiver, comprising:
an antenna array, comprising:
a first antenna, adapted for receiving a first received electric signal; and
a second antenna, adapted for receiving a second received electric signal;
a first adjusting circuit, coupled to the first antenna, adapted for delaying the first received electric signal according to an expected beam pattern formed by the antenna array to output a first adjusted electric signal;
a first electric-to-optic converter, coupled to the first adjusting circuit, adapted for converting the first adjusted electric signal into a first optical signal;
a second adjusting circuit, coupled to the second antenna, adapted for delaying the second received electric signal according to the expected beam pattern to output a second adjusted electric signal, wherein the first adjusting circuit and the second adjusting circuit are calibrated to an initial phase to enable the initial phases of the first adjusting circuit and the second adjusting circuit to be consistent, and a subsequent phase adjustment of the first initial electric signal and the second initial electric signal for the expected beam pattern are applied in response to a calibration of the initial phase; and
a second electric-to-optic converter, coupled to the second adjusting circuit, adapted for converting the second adjusted electric signal into a second optical signal.

9. The optical and electrical hybrid beamforming receiver according to claim 8, wherein the first adjusting circuit further adjusts an amplitude of the first received electric signal according to the expected beam pattern.

10. The optical and electrical hybrid beamforming receiver according to claim 8, further comprising:
an amplifier, coupled to the first antenna and the first adjusting circuit, adapted for amplifying the first received electric signal to output an amplified electric signal, wherein the first adjusting circuit delays the amplified electric signal.

11. The optical and electrical hybrid beamforming receiver according to claim 8, wherein a phase of the first adjusted electric signal and a phase of the second adjusted electric signal are different.

12. The optical and electrical hybrid beamforming receiver according to claim 8, further comprising:
a controller, coupled to the first adjusting circuit and the second adjusting circuit, adapted for setting the expected beam pattern formed by the antenna array and forming an adjustment command accordingly, wherein
the first adjusting circuit and the second adjusting circuit generate the first adjusted electric signal and the second adjusted electric signal, respectively, according to the adjustment command.

13. The optical and electrical hybrid beamforming receiver according to claim 9, further comprising:
a controller, coupled to the first adjusting circuit and the second adjusting circuit, adapted for setting the initial phase and forming a second adjustment command accordingly, wherein
the first adjusting circuit and the second adjusting circuit are calibrated to the initial phase according to the second adjustment command.

14. An optical and electrical hybrid beamforming signal processing method, adapted for a transmitter, comprising:
converting a first optical signal and a second optical signal into a first initial electric signal and a second initial electric signal, respectively;
calibrating to an initial phase to enable the initial phases of converting the first optical signal into the first initial electric signal and the second optical signal into the second initial electric signal to be consistent;
applying a subsequent phase adjustment of the first initial electric signal and the second initial electric signal for an expected beam pattern in response to a calibration of the initial phase;
delaying the first initial electric signal and the second initial electric signal, respectively, according to the expected beam pattern formed by an antenna array to output a first adjusted electric signal and a second adjusted electric signal; and
radiating electromagnetic wave through the antenna array according to the first adjusted electric signal and the second adjusted electric signal, wherein the antenna array comprises two antennas corresponding to the first adjusted electric signal and the second adjusted electric signal, respectively.

15. An optical and electrical hybrid beamforming signal processing method, adapted for a receiver, comprising:
receiving a first received electric signal and a second received electric signal through two antennas of an antenna array, respectively;
calibrating to an initial phase to enable the initial phases of converting the first optical signal into the first initial electric signal and the second optical signal into the second initial electric signal to be consistent;
applying a subsequent phase adjustment of the first initial electric signal and the second initial electric signal for an expected beam pattern in response to a calibration of the initial phase;
delaying the first received electric signal and the second received electric signal, respectively, according to the expected beam pattern formed by the antenna array to output a first adjusted electric signal and a second adjusted electric signal; and
converting the first adjusted electric signal and the second adjusted electric signal into a first optical signal and a second optical signal, respectively.

* * * * *